US010038768B2

(12) United States Patent
Ames et al.

(10) Patent No.: US 10,038,768 B2
(45) Date of Patent: *Jul. 31, 2018

(54) COUPLING OF RADIO HARDWARE WITH A MOBILE DEVICE ACTING AS A SOFTWARE DEFINED RADIO

(71) Applicant: Beartooth Radio, Inc., Bozeman, MT (US)

(72) Inventors: Kevin A. Ames, Livingston, MT (US); Michael C. Monaghan, Bozeman, MT (US)

(73) Assignee: Beartooth Radio, Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,405

(22) Filed: Feb. 17, 2017

(65) Prior Publication Data
US 2017/0163780 A1 Jun. 8, 2017

Related U.S. Application Data

(63) Continuation of application No. 14/645,171, filed on Mar. 11, 2015, now Pat. No. 9,614,573.
(Continued)

(51) Int. Cl.
H04M 1/00 (2006.01)
H04B 1/00 (2006.01)
H04B 1/3883 (2015.01)
H04B 1/3888 (2015.01)
H04B 1/3827 (2015.01)
H04M 1/21 (2006.01)
H04M 1/03 (2006.01)
(Continued)

(52) U.S. Cl.
CPC .......... *H04M 1/21* (2013.01); *H04B 1/0003* (2013.01); *H04B 1/006* (2013.01); *H04B 1/3833* (2013.01); *H04B 1/3883* (2013.01); *H04B 1/3888* (2013.01); *H04B 1/48* (2013.01); *H04M 1/03* (2013.01); *H04M 1/72527* (2013.01); *H04W 4/008* (2013.01); *H04W 4/80* (2018.02); *H04W 88/06* (2013.01)

(58) Field of Classification Search
CPC ..... H04W 88/06; H04W 76/02; H04W 16/14; H04W 88/10; H04W 24/04; H04W 88/02; H04W 24/02; H04B 1/0003; H04B 1/0007; H04B 1/0039; H04B 1/005; H04B 1/48; H04B 1/3833
See application file for complete search history.

(56) References Cited

U.S. PATENT DOCUMENTS 6,091,765 A 7/2000 Pietzold, III et al.
6,131,040 A 10/2000 Knuutila et al.
(Continued)

FOREIGN PATENT DOCUMENTS

GB 2350749 12/2000

*Primary Examiner* — Olumide T Ajibade Akonai
(74) *Attorney, Agent, or Firm* — Klarquist Sparkman, LLP

(57) ABSTRACT

The devices, systems, and methods of the present disclosure allow a radio device to connect to a mobile device. When interconnected with the radio device, the mobile device may communicate via radio connection as well as cellular network connections and other wireless connections inherent to the mobile device. Described herein are devices, systems, and methods to create a coupled mobile device and radio, with a Software Defined Radio capability operating on the mobile communication device to control the radio functionalities embedded within the radio device.

20 Claims, 10 Drawing Sheets

Related U.S. Application Data

(60) Provisional application No. 61/951,953, filed on Mar. 12, 2014.

(51) Int. Cl.
  *H04W 4/80* (2018.01)
  *H04M 1/725* (2006.01)
  *H04B 1/48* (2006.01)
  *H04W 4/00* (2018.01)
  *H04W 88/06* (2009.01)

(56) References Cited

U.S. PATENT DOCUMENTS

| | | |
|---|---|---|
| 6,351,638 B1 | 2/2002 | Robinson |
| 6,718,182 B1 | 4/2004 | Kung |
| 8,825,124 B1 | 9/2014 | Davies et al. |
| 2003/0224738 A1 | 12/2003 | Harano |
| 2009/0131044 A1 | 5/2009 | Marini et al. |
| 2014/0087722 A1 | 3/2014 | Brittain et al. |

EXAMPLE OF A TYPICAL TIER 2 SDR SYSTEM

EXAMPLE OF A TYPICAL TIER 3 SDR SYSTEM

COUPLING OF RADIO HARDWARE WITH A MOBILE DEVICE ACTING AS A SOFTWARE DEFINED RADIO

CROSS REFERENCE To RELATED APPLICATION

This is a Continuation of U.S. patent application Ser. No. 14/645,171, filed Mar. 11 2015, entitled COUPLING OF RADIO HARDWARE WITH A MOBILE DEVICE ACTING AS A SOFTWARE DEFINED RADIO, which claims the benefit of U.S. Provisional Application No. 61/951,953 filed Mar. 12, 2014, entitled COUPLING OF RADIO HARDWARE WITH A MOBILE DEVICE ACTING AS A SOFTWARE DEFINED RADIO, filed Mar. 12, 2014, both of which are incorporated herein by reference, in their entirety.

FIELD

This disclosure relates generally to systems and methods for a hardware radio device capable of attachment to a mobile device such as a cellular telephone where the mobile device acts as a Software Defined Radio (SDR) for the hardware radio device. More particularly, the present disclosure relates to an SDR operable on a mobile device communicating with a radio device that is incorporated into a docking case for the mobile device that provides the radio frequency (RF) hardware required for an SDR to operate in the high frequency (HF), very high frequency (VHF), and ultra-high frequency (UHF) two-way radio bands.

BACKGROUND

Cellular telephones have become common place in today's society. Commonly these devices have become "smartphone" devices capable of installing numerous custom software applications that enable users to experience a greater set of functionalities than a traditional telephone device. While smartphones provide a wide range of uses and software applications for users, they are still limited to communicating using only the cellular telephone and cellular data networks or in certain circumstances, Wi-Fi networks.

The cellular networks are limited in several specific areas, commonly termed here as (a) grid inadequacy, (b) grid failure, and (c) grid congestion. Grid inadequacy occurs in areas where coverage is muted or absent completely. Large swaths of rural America lack dependable grid coverage, and recreational areas such as ski areas and hiking trails lack adequate, if any, coverage. At the same time, dense urban environments have pockets of inadequate coverage, or "dead zones." Outdoor festivals may also have inadequate connectivity, or may suffer from congestion mentioned below.

Grid failure can be caused by natural or manmade disaster. Hurricane Sandy is a recent example of parts of the grid failing. Terrorist attacks have resulted in man-caused grid failure, such as in the case of 9/11. In these times, consumers will most want to be able to communicate with loved ones and the broader community.

Finally, grid congestion occurs when too many cellular phones operating on the same frequency are trying to operate in close proximity. While this doesn't affect connectivity over a handful or even multiple handfuls of units, in a densely populated area such as a concert, sporting event, or festival, connectivity can be problematic from exponential performance degradation. At large sporting events, concerts, or festivals, the traditional grid reaches congestion due to the physical limitation of today's network architecture. During these times, voice calls cannot go through and data connectivity is lost.

Unfortunately, the limitations of the cellular network do not eliminate the need for a cellular telephone user to communicate. In some circumstances, the need may be even greater when the cellular network is compromised. In these situations, handheld radios are commonly used to communicate. Handheld radios allow communication without relying on the cellular network and are able to communicate directly with each other. Unfortunately these devices commonly require specific expert knowledge and training to use and control.

What is needed is the ability to seamlessly couple a cellular telephone with a radio device which doesn't rely on the cellular network to communicate, or at the very least can utilize alternate communication methods as an intermediate step in connecting with an uncompromised cellular network. Further, this coupled radio device should utilize the capabilities of the cellular telephone to handle the complexity of the communications via a Software Defined Radio.

SUMMARY

In general, various embodiments of the present disclosure combine, in a hardware device coupled to a cellular telephone, the opportunity to extend the capabilities of a cellular telephone to operate in the HF, VHF, and UHF two-way radio bands. As a result, when the cellular telephone is coupled with the hardware device (e.g., a protective case), a user of the coupled device may communicate with other users of the same device over a radio network separate and apart from a cellular network when coverage is inadequate, a cellular network grid fails, or a cellular network grid is congested.

The present disclosure describes a mobile device or cellular telephone, the mobile device or telephone often also referred to herein as a smartphone. It should be understood that the term mobile device should not be limited to smartphones. Smartphones have the ability to function as a computer, and further have the ability to communicate over a cellular or Wi-Fi network via a network interface device. In an example of the presently described device, a smartphone is releasably secured in a protective case which may be sized and shaped to fit a specific cell phone make and model.

The case includes a radio communication device capable of transmitting, receiving, and processing radio communications. The radio communication device may further include an antenna to facilitate the transmittal and reception of radio communications. In embodiments in which the case is not integral with the radio communication device, the radio device is preferably included in hardware that interfaces with the smartphone. The case may also include a rechargeable battery to provide an additional power source to the mobile device, radio communication device, or both devices.

The mobile device and radio communication device may be communicatively coupled by either a wired or wireless connection. In the case of a wired connection, a wire from the radio communication device may be inserted through an aperture of the protective case such that the wire may connect to a data port of the mobile device. Alternatively, the radio communication device may include a port which connects directly with the data port of the mobile device. In the case of a wireless connection, the connection may be made using technology such as Bluetooth® or Wi-Fi technologies.

SDR technology allows software components already associated with and incorporated in a smartphone to control radio frequency capabilities of the radio communication device. The SDR technology may be installed to a smartphone via an application for the smartphone. Specifically, when a smartphone is enabled with SDR, a user with a smartphone may use the smartphone's interface to transmit and receive radio signals from an associated radio device by operatively controlling the controller of the radio device including the radio's controller, receiver, and transmitter. The means by which the smartphone and its SDR program communicate with the radio communication device may again be wired (e.g., via USB connection, micro-USB connection, etc.) or wireless (e.g., Bluetooth® or Wi-Fi technologies, etc.).

The SDR technology allows a mobile device or smartphone to receive a radio signal from an associated device and process that signal such that it can broadcast the radio signals and communications via the phone's speakers. Moreover, a microphone associated with the smartphone can serve as a means for broadcasting radio signal information to the radio communication device via the SDR. Such communications may be directed by a keyboard (including a touch screen keyboard) that is built in to the smartphone.

A user of the presently disclosed device and/or system may utilize his or her smartphone to communicate using existing radio frequencies. This provides the user with a number of applications for the coupled device. For example, a user may communicate with another user using the coupled device, or a user may use her coupled device to receive information broadcast over a radio network, including weather or emergency information.

DETAILED DESCRIPTION

Figure 1:
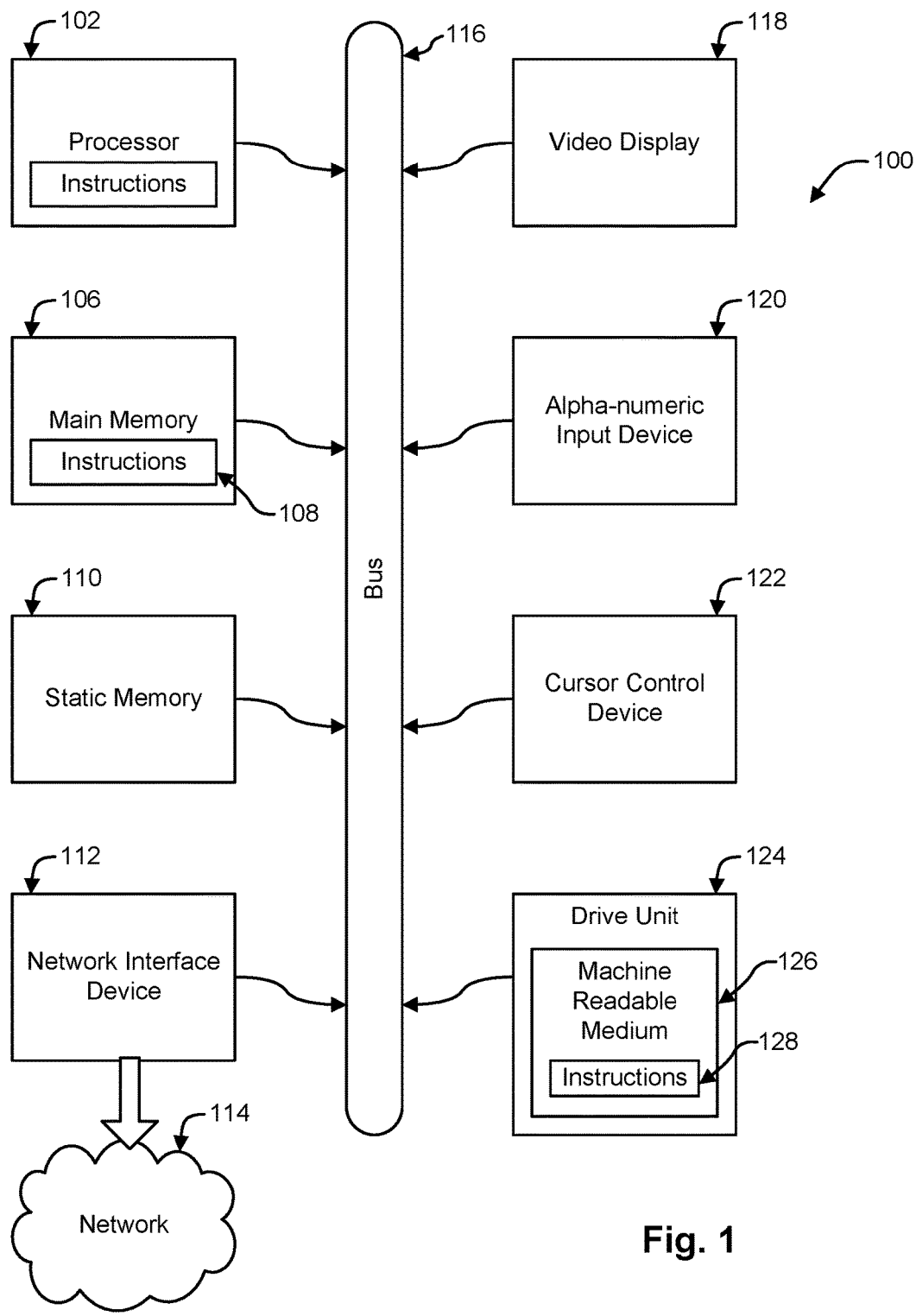
FIG. 1 is a block diagram of a computer system upon which the present disclosure's subject matter can execute.

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the example embodiments should correspond to the Figure number in which the item or part is first identified.

The description of the various embodiments is to be construed as exemplary only and does not describe every possible instance of the inventive subject matter. Numerous alternatives can be implemented, using combinations of current or future technologies, which would still fall within the scope of the claims. The following detailed description is, therefore, not to be taken in a limiting sense, and the scope of the inventive subject matter is defined only by the appended claims.

For illustrative purposes, various embodiments may be discussed below with reference to a piece of hardware that is designed to attach to a mobile device which is to be utilized as an SDR. An example discussed in detail is a cellular telephone docking case that provides the RF hardware required for an SDR application on the cellular telephone to operate in the HF, VHF, and UHF two-way radio bands. This is only one example of a suitable environment and is not intended to suggest any limitation as to the scope of use or functionality of the inventive subject matter. Neither should it be interpreted as having any dependency or requirement relating to any one nor a combination of components illustrated in the example operating environments described herein.

In the specifics of discussing an RF hardware device coupled with a mobile device, several definitions will be used in the specification. First, a "mobile device" is any portable device normally utilized for communication, specifically not including any device with existing capabilities within the HF, VHF, and UHF two-way radio bands. Such devices may include cellular telephones or any other device operable over the cellular telephone network, tablet computers, laptop computers, music players, and any other devices which make use of the internet (either wired or wireless, such as Wi-Fi, WiMAX, LTE, etc.), or other similar devices normally utilized for communication and containing at least a microphone and speaker or equivalent, e.g. via a plug-in or connectable via wireless technologies (e.g. Bluetooth®), and also capable of executing software. In addition, a "smartphone" is a mobile device which allows the user to modify the functionality to personalize the set of software applications which can be executed on the mobile device. Such applications may include a World Wide Web (WWW or web) browser, camera and video recording capabilities, tracking and logging software (e.g. vehicle mileage tracking), and global positioning software for route-finding, as well as multimedia applications for watching movies or listening to music. Further, the applications may include vendor-specific content, such as Yelp restaurant reviews or CBS television programming. Practically any type of software application may be created for use on a smartphone.

"Software Defined Radio" or "SDR" is any process relating to using software components in one functional system to control radio frequency (RF) capabilities. Specifically, the SDR must include or have the capacity to perform some or all of the following capabilities, as categorized as "Tiers."

Tier 1 describes a software controlled radio where limited functions are controllable. These functions may be power levels, interconnections, etc., but not mode or frequency.

A significant proportion of the radio is software configurable in a Tier 2 SDR. Often the term software-controlled radio (SCR) may be used. There is software control of parameters including frequency, modulation, and waveform generation/detection, wide/narrow band operation, security, etc. The RF front end (the components in the receiver that process the signal at the original incoming RF) still remains hardware based and non-reconfigurable.

Tier 3 is an ideal software radio (ISR) where the boundary between configurable and non-configurable elements exists very close to the antenna and the front end is configurable. It could be said to have full programmability.

Tier 4 is the ultimate software radio (USR) stage and is a stage further on from the ISR. Not only does this form of software defined radio have full programmability, but it is also able to support a broad range of functions and frequencies at the same time.

The embodiments described herein further include a design for a docking case for a cellular telephone where the docking case includes the electronics necessary for providing RF functionality and interoperability with the mobile device. Further, the interoperability with the mobile device may occur through existing wireless protocols, e.g. Bluetooth® or Wi-Fi technologies, or may occur via direct wired connections, e.g. through the mobile device's data port. In an embodiment, the mobile device is utilized for the microphone and speaker capability both when operating on the cellular network as well as when operating as a two-way radio. Further, the mobile device is utilized, via a software application installed upon the cellular telephone, to control the radio capabilities of the radio communication device and act as an SDR.

Importantly, the cellular network utilized by the cellular telephone provides multiple communication techniques, including voice and auditory data, text messaging, and full data (e.g. internet) capabilities. The present disclosure expects each of these capabilities to function equally over the two-way radio capabilities as well as the cellular network as determined by the user or their SDR configuration. Thus, the peer-to-peer nature of the two-way radio capabilities could be used to communicate via voice, via text messaging, or even via broadband digital data.

FIG. 1 is a block diagram of an example embodiment of a computer system 100 upon which embodiment's inventive subject matter may execute. The description of FIG. 1 is intended to provide a brief, general description of suitable computer hardware and a suitable computing environment in conjunction with which the embodiments may be implemented. In some embodiments, the embodiments are described in the general context of computer-executable instructions, such as program modules, being executed by a computer. Generally, program modules include routines, programs, objects, components, data structures, etc., that perform particular tasks or implement particular abstract data types.

The system as disclosed herein can be spread across many physical hosts. Therefore, many systems and sub-systems of FIG. 1 can be involved in implementing the inventive subject matter disclosed herein.

Moreover, those skilled in the art will appreciate that the embodiments may be practiced with other computer system configurations, including hand-held devices, multiprocessor systems, microprocessor-based or programmable consumer electronics, network PCs, minicomputers, mainframe computers, and the like. The embodiments may also be practiced in distributed computer environments where tasks are performed by I/O remote processing devices that are linked through a communications network. In a distributed computing environment, program modules may be located in both local and remote memory storage devices.

In the embodiment shown in FIG. 1, a hardware and operating environment is provided that is applicable to both servers and/or remote clients.

With reference to FIG. 1, an example embodiment extends to a machine in the example form of a computer system 100 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 100 may include a processor 102 (e.g., a central processing unit (CPU), a graphics processing unit (GPU), or both), a main memory 106 and a static memory 110, which communicate with each other via a bus 116. The computer system 100 may further include a video display unit 118 (e.g., a liquid crystal display (LCD) or a cathode ray tube (CRT)). In example embodiments, the computer system 100 also includes one or more of an alpha-numeric input devices 120 (e.g., a keyboard), a user interface (UI) navigation device or cursor control device 122 (e.g., a mouse, a touch screen), a disk drive unit 124, a signal generation device (e.g., a speaker), and a network interface device 112. The aforementioned components also communicate with each other via the bus 116.

The disk drive unit 124 includes a machine-readable medium 126 on which one or more sets of instructions 128 and data structures (e.g., software instructions) embodying or used by any one or more of the methodologies or functions described herein are stored. The instructions 128 may also reside, completely or at least partially, within the main memory 108 or within the processor 104 during execution thereof by the computer system 100, the main memory 106 and the processor 102 also constituting machine-readable media.

While the machine-readable medium 126 is shown in an example embodiment to be a single medium, the term "machine-readable medium" may include a single medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that are able to store information for a period of time, however brief. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 128 may further be transmitted or received over a communications network 114 using a transmission medium via the network interface device 112 and utilizing any one of a number of well-known transfer protocols (e.g., FTP, HTTP). Examples of communication networks include a local area network (LAN), a wide area network (WAN), the Internet, mobile telephone networks, Plain old telephone service (POTS) networks, wireless data networks (e.g., WiFi and WiMax networks), as well as any proprietary electronic communications systems that might be used. The term "transmission medium" shall be taken to include any intangible medium that is capable of storing, encoding, or carrying instructions for execution by the machine, and includes digital or analog communications signals or other intangible medium to facilitate communication of such software.

The example, computer system 100 includes operation of the entire system on a remote server, with interactions occurring from individual connections over the network 114, to handle user input as an internet application.

Figure 2:
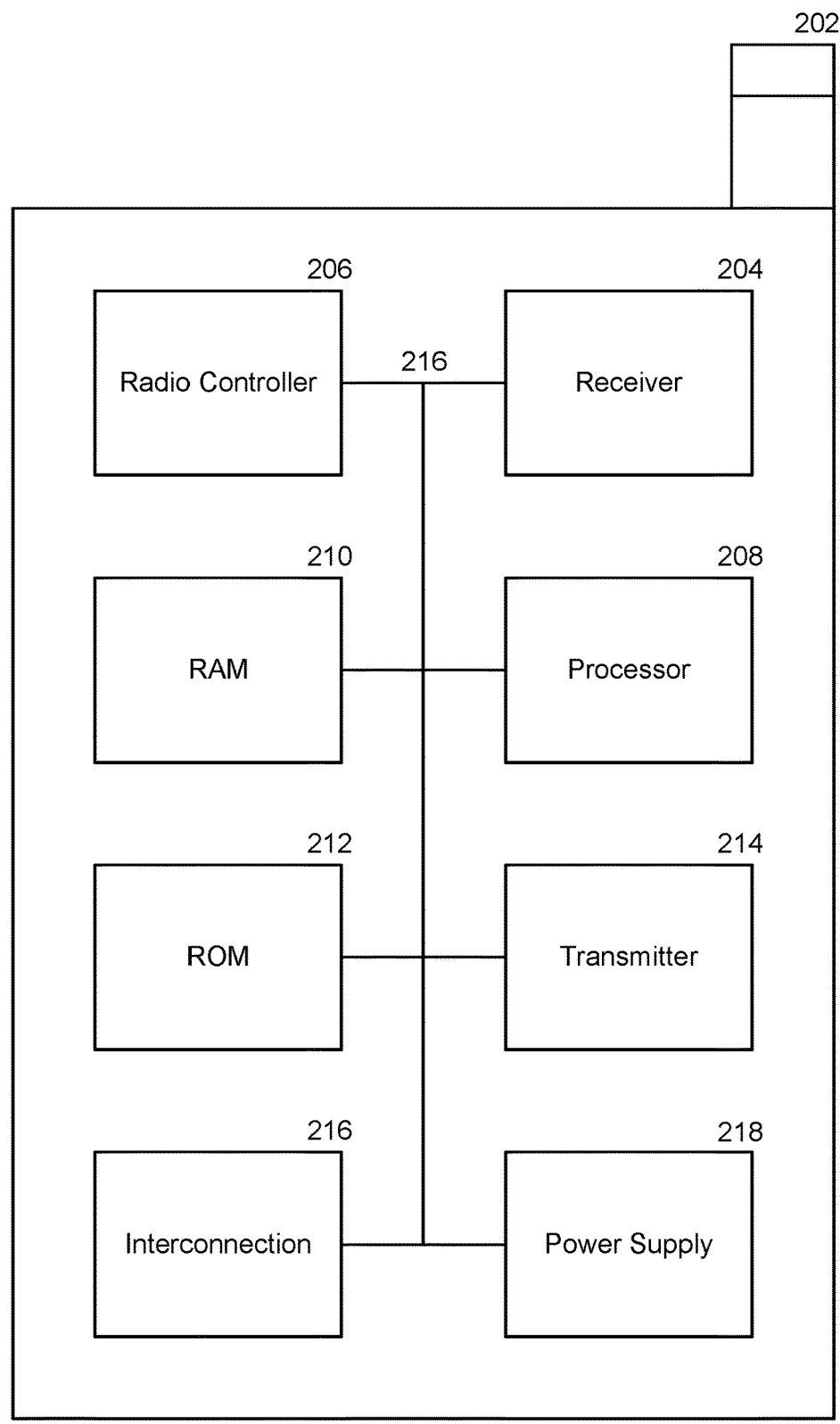
FIG. 2 is a block diagram of a radio communication device upon which the present disclosure's subject matter can execute.

FIG. 2 illustrates a mobile radio communication terminal device 200. The mobile radio communication terminal device 200 may include an antenna 202, a receiver 204 coupled to the antenna 202, a radio controller 206 coupled to the receiver 204, a processor 208, a volatile or non-volatile random access memory (RAM) 210, a non-volatile read only memory (ROM) 212, and a transmitter 214, also coupled to the antenna 202. Furthermore, the mobile radio communication terminal device 200 in some embodiments may include a display, keys, a microphone, a loudspeaker and other conventional components of a mobile radio communication terminal device. In other embodiments, these components are utilized from an externally connected device associated with the mobile radio communication terminal device 200. In one embodiment, the antenna 202, the receiver 204, the radio controller 206, the processor 208, the RAM 210, the ROM 212, and the transmitter 214 may be coupled with each other, for example via a connection structure such as an interconnection bus 216.

The receiver 204 receives radio signals, and the transmitter 214 transmits radio signals. Furthermore, the receiver 204 may store the received radio signals in a memory such as in the RAM 210. The radio controller 206 controls the receiver 204 and the transmitter 214. In an embodiment of a Tier 2 SDR system, the radio controller 206 may control, but is not limited to controlling, the transmitter's 214 center frequency, modulation scheme, power level, and harmonic filters in addition to controlling the receiver's 204 center frequency, front-end filtering topology, demodulation scheme, and gain control. The radio controller 206 may be configured to control the receiver 204 and the transmitter 214 such that at least one frequency band of a radio access technology is available for communication. The radio controller 206 may be then configured to pass the demodulated/non-modulated signals to/from the processor where further signal processing may be applied. Alternate embodiments may be adapted in all four tiers of software defined radio. For example, Tier 1 SDR may be implemented, where the control and signal processing is accomplished entirely in hardware via the receiver 204, transmitter 214, and radio controller 206. Likewise, a Tier 3 SDR may be implemented, where the control and signal processing is accomplished entirely by software in the processor 208. The radio controller 206 as well as the processor 208 may be any type of hard-wired logic or programmable logic implementing the required functionality, e.g. implementing the procedures in accordance with the described embodiments. A programmable logic may be a programmable processor such as a microprocessor (e.g. a Complex Instruction Set Computer (CISC) processor or a Reduced Instruction Set Computer (RISC) processor). The computer program code for the radio controller 206 as well as the processor 208 may be stored in the ROM 212. In one embodiment, the radio controller 206 and the processor 208 may be monolithically integrated in one processor. In other words, one processor provides the functions of the radio controller 206 and of the processor 208. The processor 208 may be provided for the conventional functions of a radio communication terminal device.

The interconnection components 216 may be direct wiring or wireless connections utilizing standard capabilities shared with the interconnected mobile device. In some embodiments a direct wired interconnection 216 may involve a standard plug common to both components, such as a USB connection, or may require a permanent connection, e.g. soldering. In other embodiments where the interconnection 216 is wireless, a standard near-field protocol such as Bluetooth®, or a longer field protocol such as Wi-Fi, may be utilized for the communication with an interconnected device. In yet other envisioned embodiments, both a wired and a wireless interconnection 216 may be utilized, for example a wired connection for sharing power between interconnected devices and a wireless connection for sharing data between interconnected devices.

The power supply 218 in some embodiments is a battery, such as lithium-ion, lithium polymer, alkaline, nickel cadmium, nickel metal hydride, or the like. In an alternative embodiment, the battery may be absent and rely upon an external power, either from an interconnected device or from an alternate external power source. Some embodiments may provide a power supply 218 with sufficient capacity to power both the mobile radio communication terminal device 200 as well as primary or supplementary power for an interconnected device.

Figure 3:
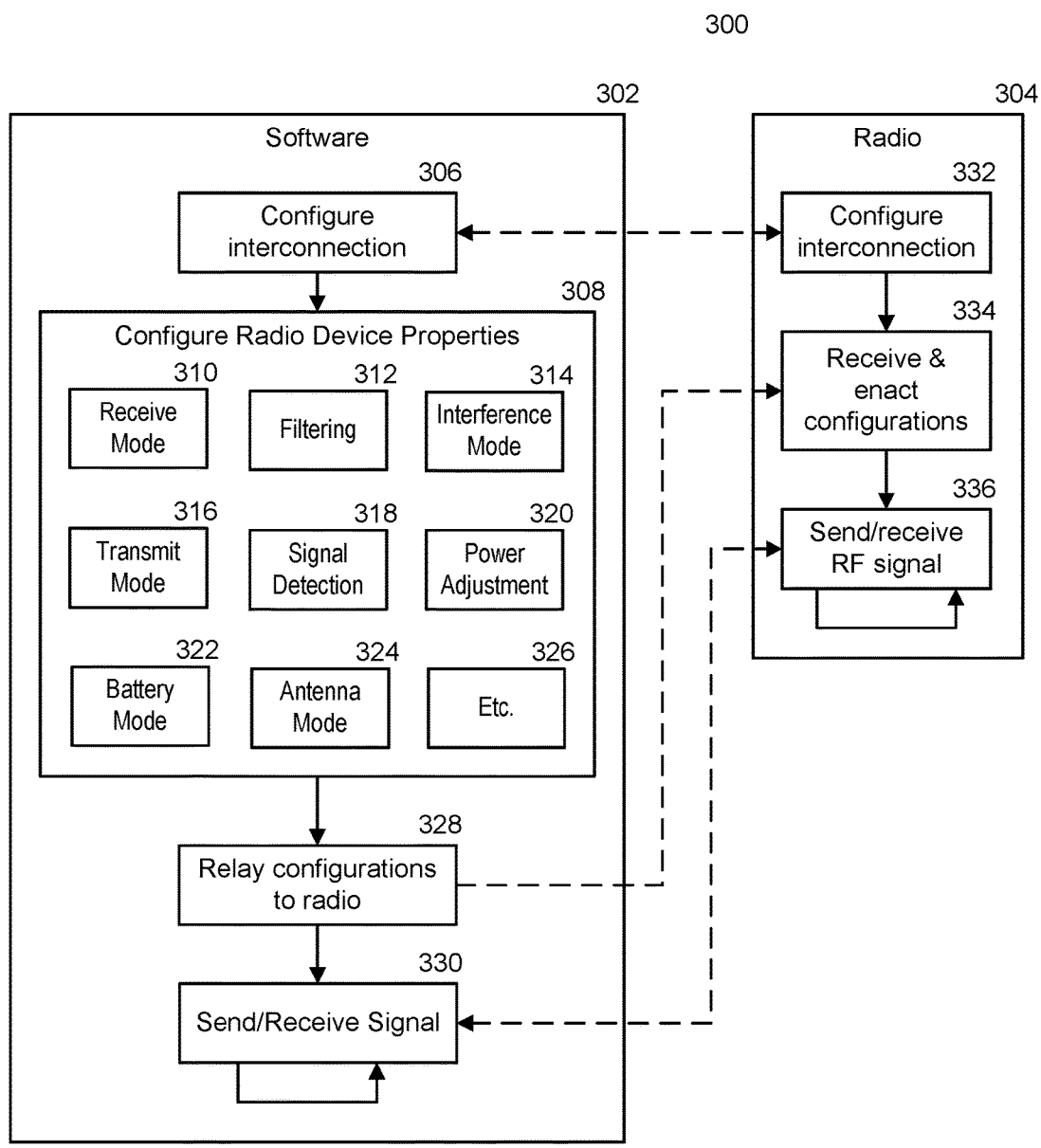
FIG. 3 is a block diagram illustrating one particular method for performing interactions between a software application of a computer system such as that of FIG. 1 and a radio communication device such as that of FIG. 2 according to the teachings of the present disclosure.

A complex mobile radio device 300, illustrated in FIG. 3, utilizes a software component 302 and a radio component 304 to allow for SDR capabilities. In one embodiment the software 302 executes on a separate mobile device from the radio communication terminal device 200. The separate mobile device is a generic computing device, such as computer system 100. In other alternative embodiments, the software 302 could exist on a third system (e.g. neither the radio 200 nor the mobile device 300) or could exist within the radio 200 as a separate capability manifesting within elements 208, 210, and/or 212.

The first step in utilizing SDR capabilities is to configure the interconnections 306, 332 between the software 302 and radio device 304, represented by the dashed line indicating bi-directional communications. Configuring interconnections 306, 332 involves synchronizing the communication between the two systems 302, 304, negotiating a communication handshake for administrative configuration activities, and other optional activities (e.g. Bluetooth® connection, password exchange, or other security protocols, etc.). The interconnection between the software 306 and radio device 332 may be wired, for example by a USB connection. Alternatively, the interconnection between the software 306 and radio device 332 may be wireless, for example using Bluetooth® or Wi-Fi technologies. Those skilled in the art will further envision other ways an interconnection may be formed.

In the present embodiment, the interconnection component 216 on the radio 304 provides the interconnection capabilities. Once the interconnection is configured 306 within the software 302, the software user begins configuring the radio device capabilities 308. Device configuration may comprise at least one of: configuring the receive mode 310 of the radio (e.g. frequencies used, demodulation scheme used, scanning capabilities or single frequency use, etc.); configuring the transmit mode 316 of the radio (e.g. frequencies used, modulation scheme used, whether transmitting is allowed, etc.); determining what types of filtering 312 are used for signal processing (both radio frequency and audio frequency and other relevant signal enhancement), determining what type of interference mode 314 is utilized (e.g. error correction method for spread spectrum techniques, identification of cooperating radios, etc.); determining signal detection 318 functionalities (similar to filtering 312, but often incorporating more complex analyses); generating power adjustment 320 methods (e.g. adapting signal strength relevant to atmospheric conditions or proximity of the second radio communication device); determining appropriate battery mode 322 (e.g. specifying how the radio device power source 218 is used in conjunction with the power needs of the interconnected mobile device); determining appropriate antenna mode 324 (e.g. antenna selection, pre-amplification, etc.); and any number of other 326 configurable or controllable aspects of radio communications.

Once the radio device properties 308 are configured, those capabilities are communicated to the radio 328 and the radio 304 receives and enacts the configurations 334, as indicated by the dashed unidirectional line, which manifest within various components 206, 208, 210, 212 (illustrated in FIG. 2) within the radio 304. Finally, the software 302 and the radio 304 proceed to send and receive signals 330, 336 as defined by the various configurations 328, 334, and represented by the bidirectional dashed line, using the radio to communicate with an external radio source, using the appropriate radio components 202, 204, 214.

Figure 4:
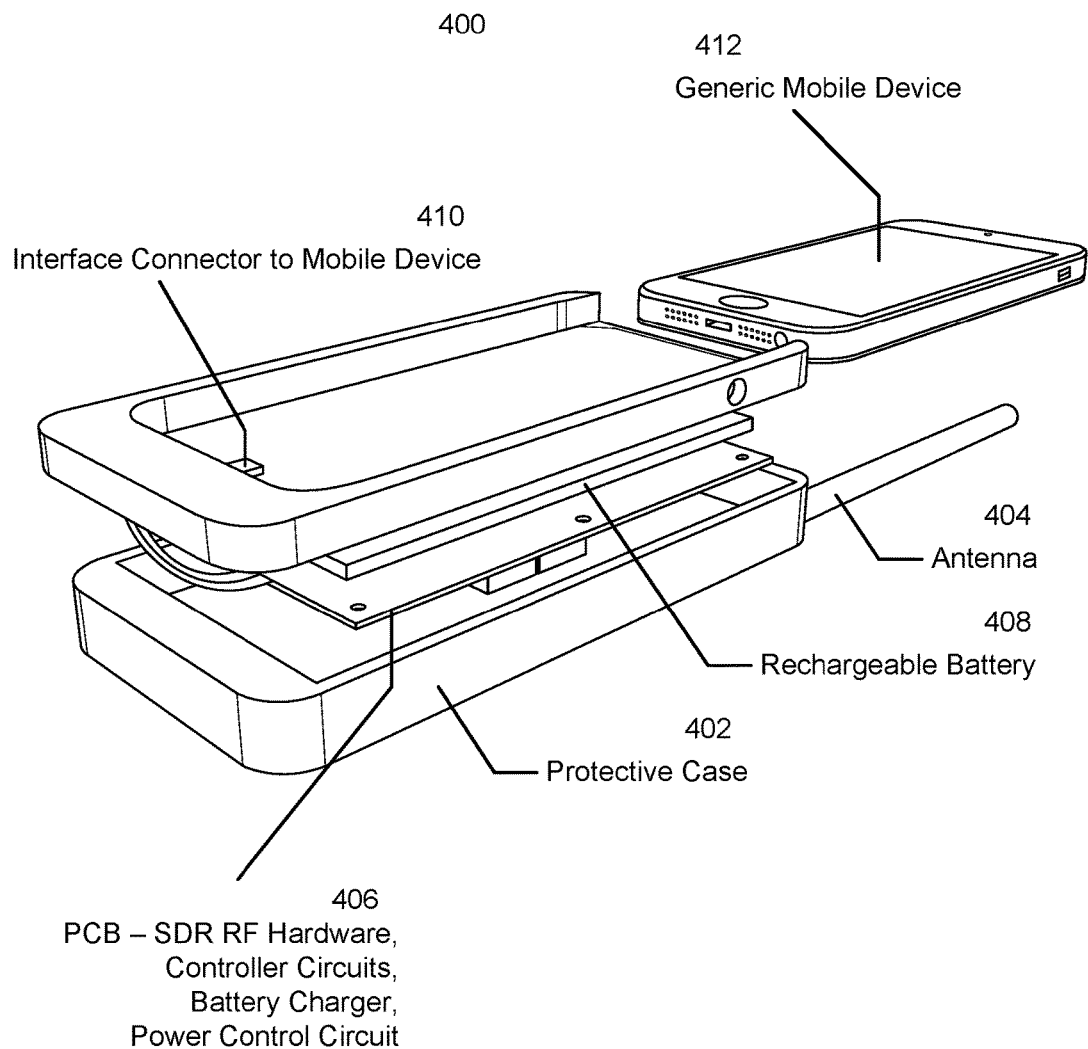
FIG. 4 is an exploded perspective view of a communication device for incorporating a radio device with a mobile device according to the teachings of the present disclosure.

FIG. 4 is an exploded illustration of one embodiment of a communication device 400 incorporating a radio device with a mobile device. A protective case 402 encloses components and is configured to receive and releasably secure a mobile device 412. An antenna 404 is coupled to the protective case 402, which in certain embodiments may be fixed in an extended form from the case 402, while in other embodiments may be collapsible to reside within the case 402 when not in use and extended when in use. In other embodiments, the antenna 404 may be incorporated entirely within the case 402. Radio electronics or device 406 exist embedded within the case 402, and in some embodiments, a rechargeable battery 408 may further be embedded within the case 402. The radio electronics 406 embedded in the case 402 may include those illustrated in FIG. 2, for example a radio controller 206, receiver 204, transmitter 214, etc.

The protective case 402 allows the radio electronics 406 to communicatively couple with the mobile device 412 as previously noted when describing FIG. 3, with some embodiments using a direct connection 410 as an interface to connect the mobile device 412 and radio electronics 406. The mobile device 412 and radio electronics 406 may be connected in a wired or a wireless configuration. In the wired configuration (illustrated in FIG. 4), the interface connector 410 includes an opening through which a connection such as a USB cord or the like may be threaded, the connection corresponding to a data port of the mobile device 406. It should be noted that various makes and models of mobile devices 412 will have varying data port configurations, and the cases 402 and connectors 410 of the present disclosure may be configured and manufactured to accommodate those makes and models. When the mobile device 412 and connection 410 is wireless, the connection may be made using Bluetooth® technology, Wi-Fi, or other technology known in the art.

Thus, the complete protective case 402 is a single unit consisting of multiple assembled components which, in conjunction, allow for the physical enveloping of a mobile device to make a single coupled device. It is envisioned that mobile devices 412 for use with the case 402 will have unique dimensions, connection types, and connection locations, and as such each case 402 may have mobile device-specific configurations.

Figure 5:
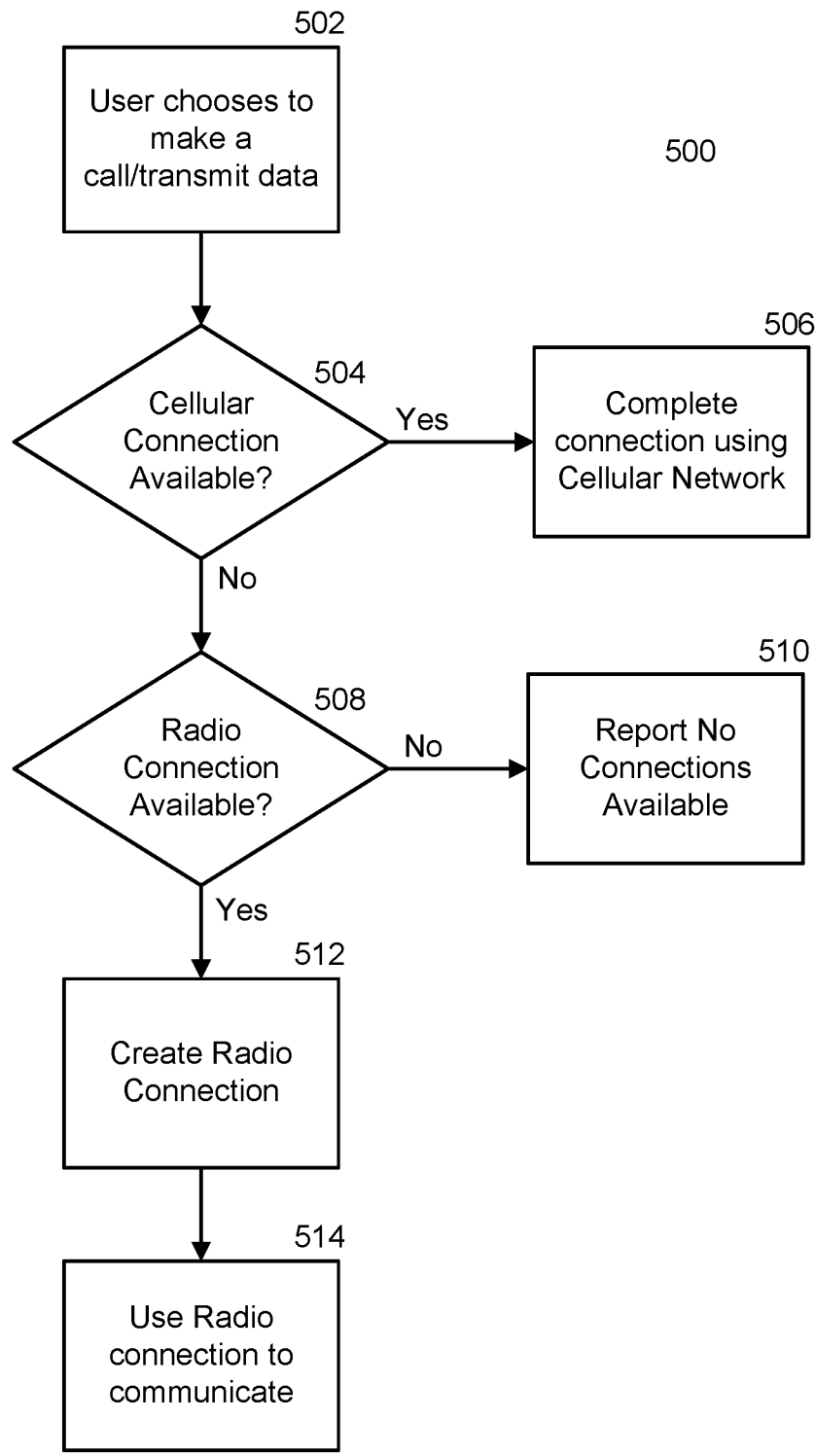
FIG. 5 is flow chart of a process by which a user can make a call or transmit data using the communication device of FIG. 4.

FIG. 5 is a flow chart 500 representing one possible embodiment for utilizing a radio device in conjunction with a cellular network-based mobile communication device. FIG. 5 assumes that the mobile device and the radio device have already been successfully paired and configured as shown via interconnections 306 and 332 (pairing) and elements 308, 328, and 334 (configuring). FIG. 5 begins with a mobile device user choosing to make a call or transmit data 502. Upon activation, the cellular device determines if it is able to access a cellular network 504. If the cellular network is available, then the mobile device connects to the cellular network 506 using means inherent in the mobile device that are well known throughout the field. However, if there is no available cellular connection 504, then the coupled mobile and radio device determines if there is a radio connection available 508. This determination is made by sending a signal or recognizing if external signals have been recently sent to indicate other radio devices within range. If no radio devices are discovered within range, then the mobile device user is notified that no service is available to complete their request 510. However, if other radio devices are available 508, then a connection to one or more of the available radio devices is made 512 and the user's communication is made using the radio connection 514 of the coupled mobile and radio device.

Notably, while the actions are described with the cellular network as the first choice for connection, it is envisioned that alternate embodiments may allow a preference for the radio communication to be attempted first, or the mobile device user may be prompted for a preference of which available connection type to use. Similarly, if a mobile device is capable of both voice and data communication, one channel (e.g. cellular network or radio) may be used for voice only and the other for data only, with a corresponding level of preference, configuration, or user prompting to determine which channel to use for which communication type. Similarly, distinct radio frequencies could be used by the radio channel for each of voice and data communications.

Figure 6:
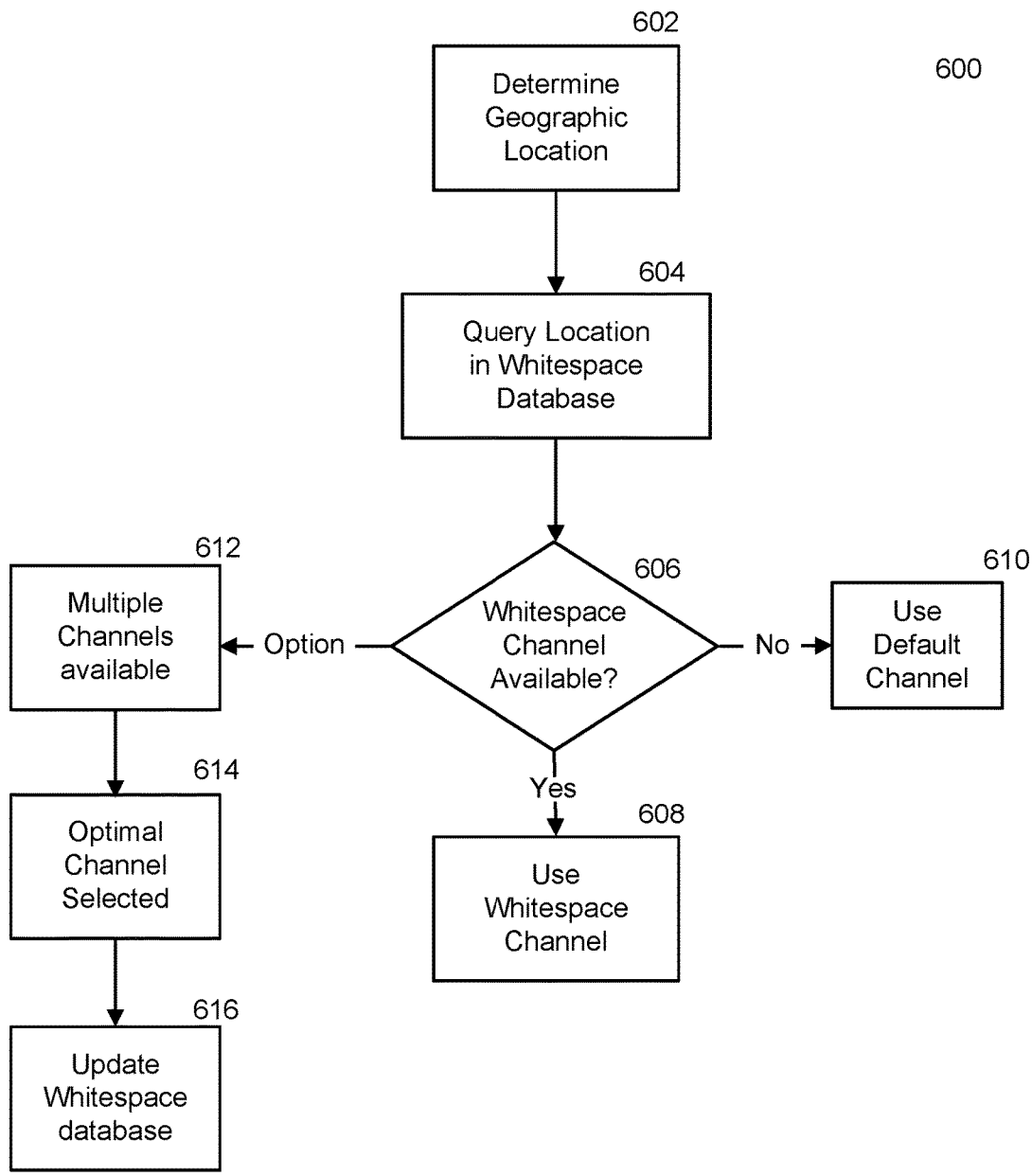
FIG. 6 is a flow chart of a process by which a user may identify a whitespace channel using the communication device of FIG. 4.

FIG. 6 is a flow chart of one possible embodiment for utilizing a whitespace database 600 to determine the proper frequency for radio communications. A whitespace database is defined, in this context, to contain a list of available frequencies for a given geographical region. Available frequencies may be determined via regulatory means (e.g. the FCC) or via common consensus or any other identifiable manner. The geographical region may be a local area such as a building or city block, a larger area such as a city or county or mountain range or similarly sized area, or larger such as a state, or a country, or any combination of the preceding. The whitespace database may exist within the software defined radio capabilities residing within the mobile device or may exist within the radio device independent from the mobile device.

Utilizing a whitespace database 600 begins with identifying the current geographic location 602. This may be accomplished using a GPS capability within the mobile device, within the radio, or a combination of both (e.g. for better accuracy), or alternatively using triangulation techniques with known cellular towers or other radio transmitters (e.g. broadcast radio stations, television stations, aircraft beacons, etc.). Once the geographic location is known 602, this information is used to query a whitespace database 604. A whitespace database contains at least the pairing of a geographic location and an available frequency, but may additionally contain multiple available frequencies or frequency ranges, and may in some embodiments also contain a preference indicator (e.g. high, medium, low) for a given frequency. The query of the whitespace database 604 proceeds to determine if a whitespace channel is available 606 for the current geographical location 602. If there is a frequency identified as available, then that whitespace channel is used 608 for communication. However, if no whitespace channel is identified as available then a default frequency channel is used 610, or the radio system may be disabled.

Optionally, in some embodiments, multiple whitespace frequencies may be identified 612, allowing for a selection of an optimal channel 614 to occur. The selection 614 may be automatic, e.g. using the first returned option or the middle-most frequency of all available frequencies. Alternatively, the frequency selection may be more intelligent, for example by utilizing a quality metric obtained from the whitespace database. Alternatively, multiple frequencies may be tested by the radio to determine the channel with the best communication properties. Similarly, the frequency selection may be made by the radio user from among multiple frequencies available and given any of (1) no information, (2) frequency preference information from the database, or (3) current condition tested communication quality metrics for each of the available frequencies. Finally, in some embodiments the whitespace database may be updated 616 based upon identified user preferences or tested communication properties.

Figure 7:
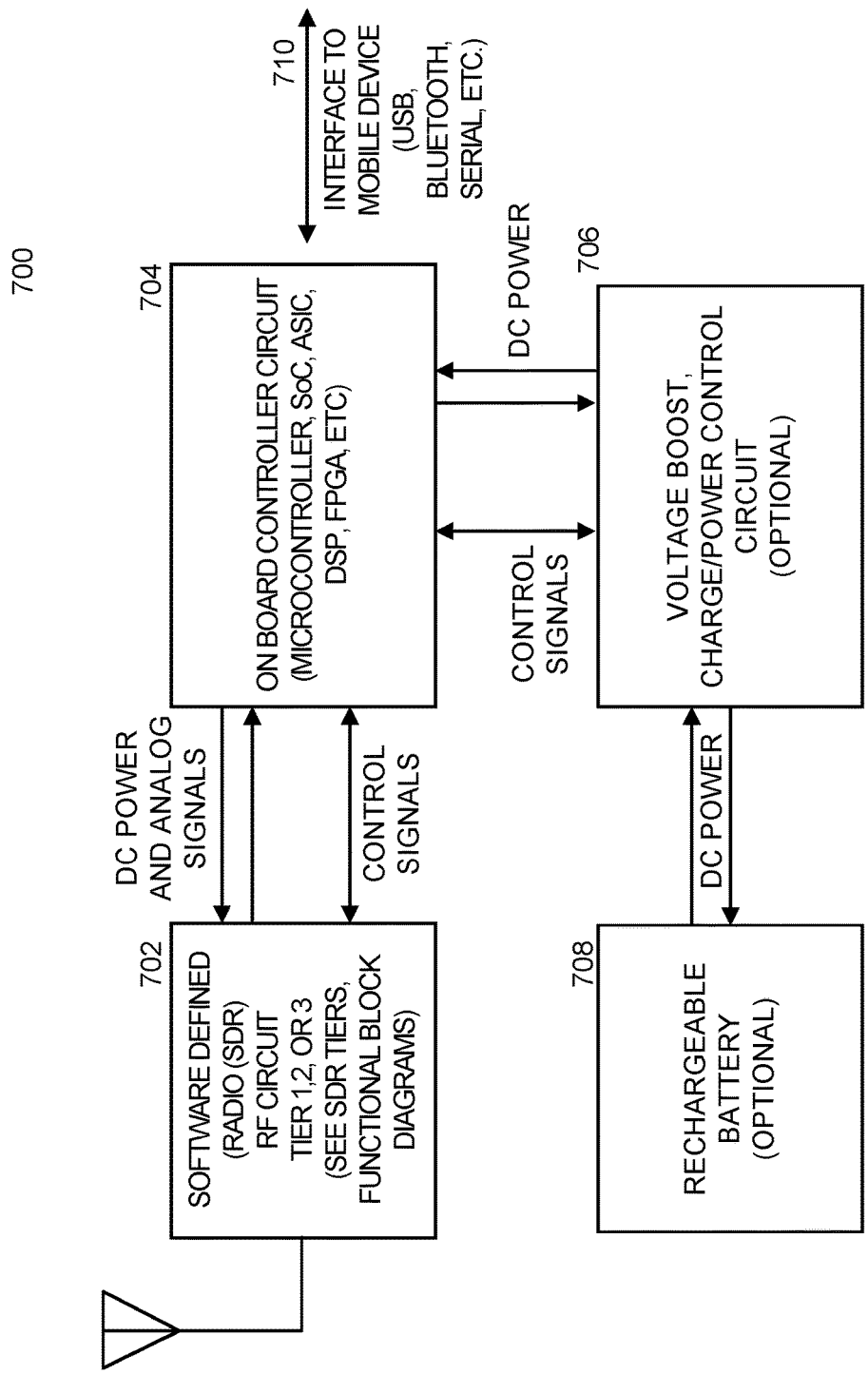
FIG. 7 is a block diagram of a representative embodiment of the electronic functional components necessary to interact with a software defined radio system.

FIG. 7 is a block diagram of a representative embodiment 700 of the electronic functional components necessary to interact with an SDR. Such SDR component interactions were broadly discussed in the description of FIG. 3. An SDR RF circuit 702 includes the circuitry necessary to enable Tier 1, 2, or 3 SDR capabilities, as previously defined. The SDR RF circuit 702 interconnects to an onboard controller circuit 704 via DC power and analog signals as well as control signals, as indicated. The onboard controller circuit 704 may interconnect with voltage and power circuits 706, also via DC power and control signals as indicated. Finally, if a rechargeable battery 708 is further connected, it is interconnected with the voltage and charge system 706. These components are connected via the onboard controller 704 to the mobile device 710, which manifests the software component of the SDR.

Figure 8:
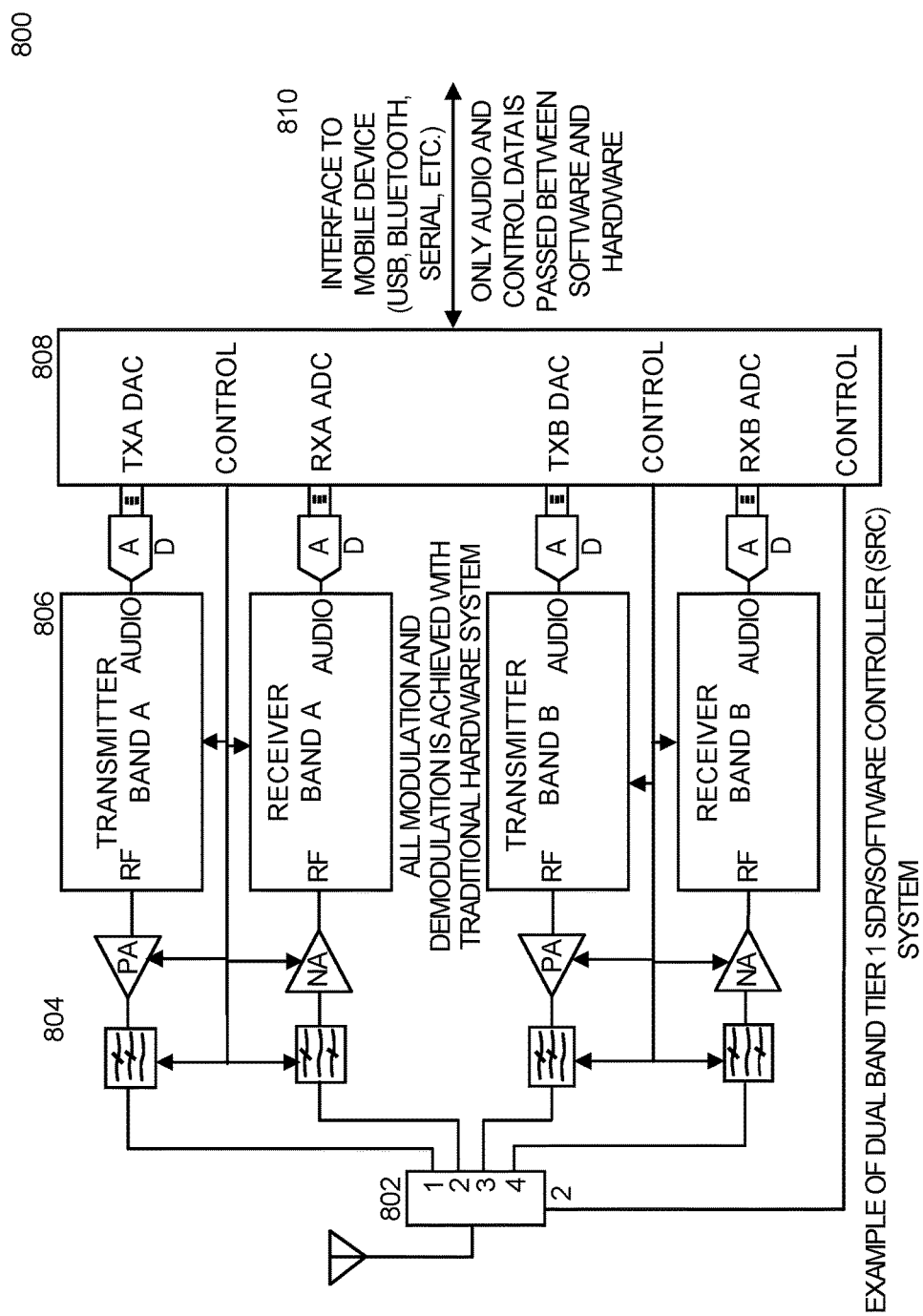
FIG. 8 is a block diagram of an example embodiment of a Tier 1 software defined radio system.
Figure 9:
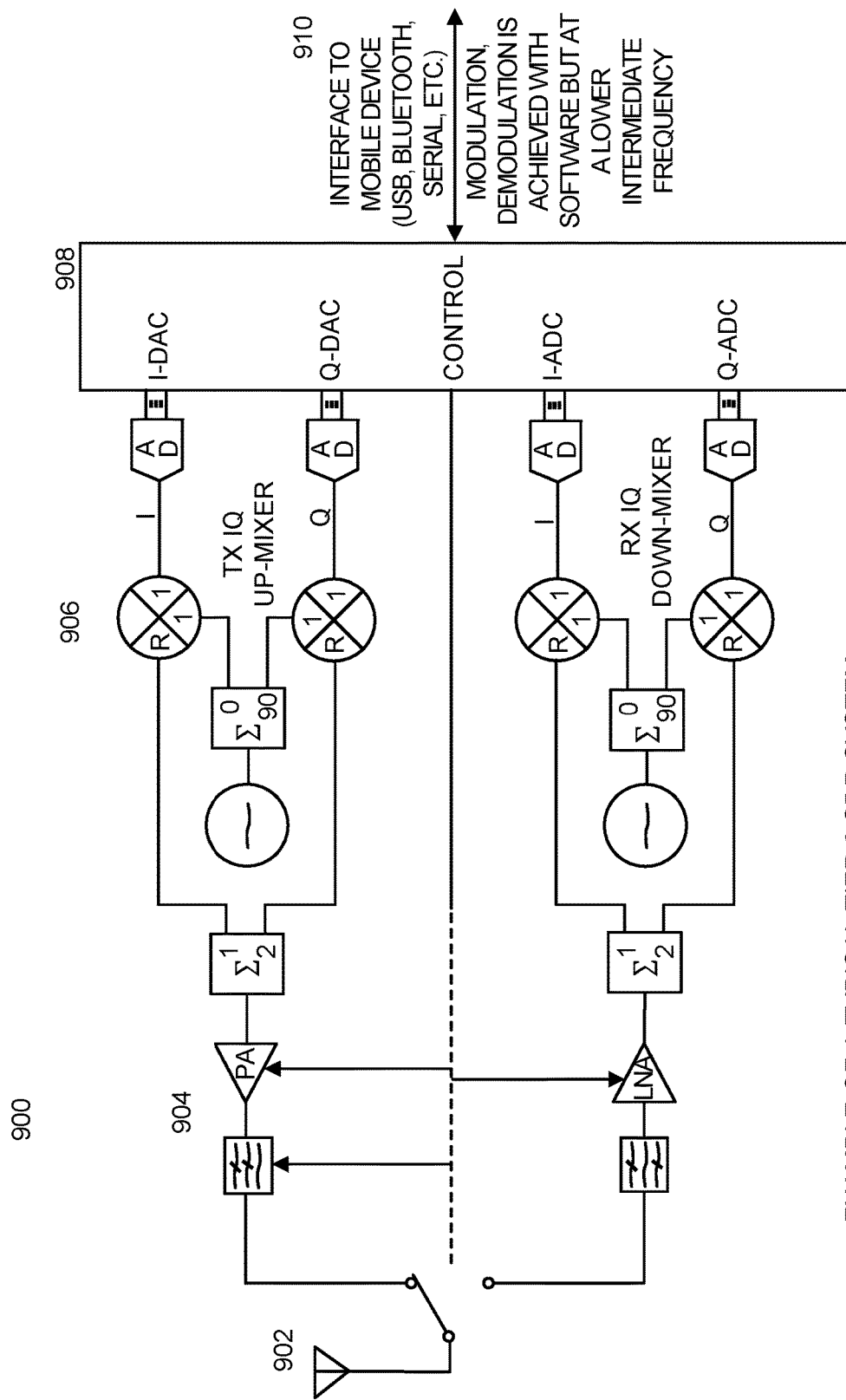
FIG. 9 is a block diagram of an example embodiment of a Tier 2 software defined radio system.
Figure 10:
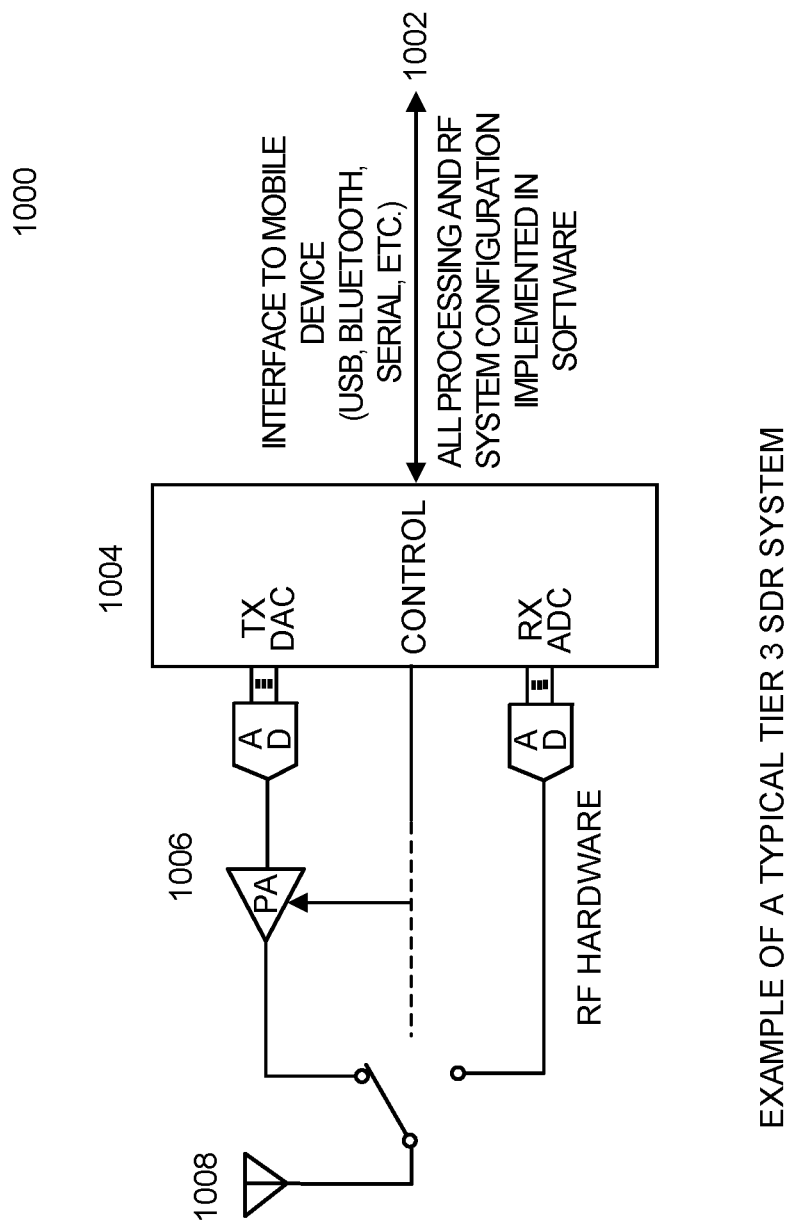
FIG. 10 is a block diagram of an example embodiment of a Tier 3 software defined radio system.

FIGS. 8-10 illustrate example embodiments of Tier 1, 2, and 3 SDRs. FIG. 8 is a functional descriptive circuit diagram of one possible embodiment of a dual band Tier 1 SDR 800. SDR component interactions are also discussed above when describing FIG. 3. Component 802 represents the transmit-receive switching and various frequency band selection capabilities of the antenna. Components 804 are representative of the various filtering, amplification, and control circuits for sending and receiving radio signals. Components 806 show two transmitter and receiver bands, A and B, of which additional bands may be used as desired. Component 808 provides the software interface point for the various control and analog/digital conversions. This control point 808 interfaces with the mobile device 810, manifesting the software component of the SDR.

FIG. 9 is a functional descriptive circuit diagram of one possible embodiment of a multi-band Tier 2 SDR 900. SDR component interactions are also discussed above in describing FIG. 3. Component 902 represents the transmit-receive switching and various frequency band selection capabilities of the antenna. Components 904 are representative of the various control circuits for sending and receiving radio signals. Components 904 represent the various mixer circuits necessary for baseband frequency and quadrature signal conversion necessary for a Tier 2 SDR. Component 908 provides the software interface point for the various control and analog/digital conversions. The control point 908 interfaces with the mobile device 910, manifesting the software component of the SDR.

FIG. 10 is a functional descriptive circuit diagram of one possible embodiment of a multi-band Tier 3 SDR 1000. SDR component interactions are also discussed in describing FIG. 3 above. The software component of the SDR 1002 interacts with the front-end control and digital/analog conversion circuits 1004. The conversion and front-end control circuits 1004 then send signals through additional amplification circuits 1006 to be selectively sent and received via the multi-band antenna 1008.

A number of practical examples further illustrate the utility and features of the present disclosure. In one example, a mobile device user, bothered by poor cellular network coverage and poor battery life on her mobile, downloads a software application for her smartphone to allow learning more about the various features and options available with the presently described device and system. The user purchases a case 402 configured for use with her cell phone brand and model, into which she inserts her cell phone. Following directions generated from the software application already installed on her smartphone, the user may be required to perform a simple Bluetooth® or other pairing (with or without wires) between her cell phone and the case 402. Once the cell phone and case 402 are paired, the user may use the coupled device to complete both cellular calls and data transactions as well as radio calls and data transactions. Further, if the case includes an extra battery 408, the user may have extended battery life for her smartphone.

In a second illustrative example, a user is in a geographic region with little or no connectivity to a cellular network, in this case a wilderness hiking area. The user, wielding a mobile phone connected with case 402, enters a region with no connectivity to a cellular network (referred to colloquially as a "cellular dead zone"). The user wants to inform a friend up the trail who is also wielding a mobile phone and case 402 which way she is going to turn at a junction in the trail. FIG. 5 illustrates the process that will transpire.

Unable to make a cellular connection 504, the device searches for a radio connection 508. The device reports that the user's friend is available for a radio connection. The device then connects 512 to the user's friend's device. The user and her friend then may communicate 514 about the turn the user is making at the trail junction via radio communication 514.

On the same hike, the user may receive information about weather via the radio functions of the device illustrated in FIG. 3 when the mobile device 302 is receiving a signal 330 from the radio device 304.

In another example, a severe storm knocks out the user's electricity as well as the cellular network in her area, rendering the user unable to contact the power company to let them know of the situation and begin repairs. When the user attempts to call, the user's coupled device will recognize that there is no service 504 and will search for a radio connection 508. The device discovers that a neighbor's device is within range and it connects with the other neighbor's device 512. By communicating via the radio connection 514, the user asks the neighbor (who has electricity) to contact the electricity company, for the user, once they complete their radio conversation.

Another example illustrates the disclosed device and system's utility during times of grid congestion. In this example, the congestion takes place at a highly populated outdoor concert. In such a scenario, there may not be much cellular coverage in the area even when not many people are around, but as soon as the event starts filling up, available service goes away and it is nearly impossible to get a connection. In the example, a user and her friend both have their mobile phones connected with a case 402 in the disclosure described herein. At one point during the concert, the two friends become separated. The user and her friend contact one another using the radio connection 512 and discuss how and when to get back together 514.

In the same scenario, the user and her friend notice more and more people using radios to communicate, and the user and her friend have difficulty finding a way to communicate on a private channel Thus, they decide that instead of using the default channel 610, they will opt to use an alternate radio channel 612 to communicate. They select an available channel 614 and have no further issues.

In a separate example, a user, with case 402 for her smartphone, nears the allotment of her current cellular provider's plan for the number of voice minutes she could use before getting charged for overage amounts. Wanting to chat with a friend, but not wanting to be charged extra for a call, the user connects via radio 512 to chat 514 with her friend.

In a similar scenario, the user has data she wishes to upload (e.g., pictures to a social networking site) but does not want to pay extra for going over her plan's allotment. The user can set her smartphone to connect to a friend's phone 512 for a data connection. The user can use her own phone to upload the data she wants via her friend's cellular data connection 514.

In addition to private users, commercial users have a compelling need for the presently disclosed device and system, which numerous examples illustrate. Numerous workers in businesses including heavy construction, security, and retail use two-way radios to communicate with other workers on a job site, and smartphones to communicate with workers and vendors not on the job site. The presently disclosed device and system can combine these two devices into a single streamlined device, allowing workers to worry about only keeping one device available rather than two.

There are roughly 1.5 million first responders in the United States, defined as local police and firemen. In addition, there are untold numbers of workers for three letter governmental agencies and quasi-governmental agencies that are dependent on two-way radios for critical communication. Commonly today each of these workers carries both their cellular telephone as well as the two-way radio necessary to perform their job duties. Once again, it is advantageous for the communication device to provide a single piece of equipment the worker can use to provide capabilities for both roles to reduce the number of devices each worker must carry.

The examples provided above are not intended to be an exhaustive explanation of each possible operation of the systems and methods described herein, and the various embodiments are not limited to any example described above.

Although an overview of the inventive subject matter has been described with reference to specific example embodiments, various modifications and changes may be made to these embodiments without departing from the broader spirit and scope of inventive subject matter.

As is evident from the foregoing description, certain aspects of the inventive subject matter are not limited to the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The invention claimed is:

1. A communication device for use with a mobile device comprising:
a radio communication device including a receiver and transmitter for receiving and transmitting radio signals between the communication device and another communication device, the radio communication device further including a controller for operatively controlling the receiver and transmitter;
an antenna communicatively coupled with the receiver and transmitter;
a connection between the mobile device and radio communication device, wherein the mobile device provides radio configuration data for configuring the receiver and the transmitter of the radio communication device, and
a software defined radio circuitry coupled to the receiver and the transmitter of the radio communication device, the software defined radio circuitry including hardware circuitry for configuring the receiver and the transmitter of the radio communication device based on the received radio configuration data from the mobile device, the hardware circuitry including at least a digital to analog converter and one or more amplification circuits.

2. The communication device of claim 1 wherein the connection between the mobile device and radio communication device is a wireless connection.

3. The communication device of claim 1, further comprising a protective case comprising a housing for receiving and securing the radio communication device.

4. The communication device of claim 3 wherein the connection between the mobile device and radio communication device is a wired connection via an interface port of the protective case.

5. The communication device of claim 3 wherein the antenna extends from the protective case.

6. The communication device of claim 3 wherein the antenna is embedded in the protective case.

7. The communication device of claim 1 wherein the communication device further includes a rechargeable battery.

8. The communication device of claim 1, wherein the software defined radio circuitry configures at least one of a center frequency, a modulation scheme, a power level, or a filtering scheme.

9. The communication device of claim 1, wherein the mobile device further provides outbound data to radio communication device via the connection, the outbound data to be sent by the radio communication device via the transmitter to the other communication device, and wherein the radio communication device provides inbound data to the mobile device via the connection, the inbound data received by the radio communication device via the receiver from the other communication device.

10. A communication system comprising:
a mobile device including a processor and an electronic memory, said processor operable to execute software stored in the electronic memory as a software defined radio application;
a communication device including:
a radio communication device having a receiver and transmitter for receiving and transmitting radio signals;
a protective case housing the radio communication device therein; and
an antenna attached to the protective case, said antenna being in communication with the receiver and transmitter;
wherein the communication device provides a connection between the mobile device and the radio communication device for communicatively coupling the mobile device with the radio communication device;
and wherein the software defined radio application is in communication with the radio communication device via the connection, and wherein the software defined radio application operatively controls the receiver and transmitter of the communication device.

11. The communication system of claim 10, wherein the software defined radio application communicates with a controller located in the protective case housing of the communication device, and said controller operatively controls the receiver and transmitter of the communication device.

12. The communication system of claim 10, wherein the connection between the mobile device and radio communication device is a wired connection via an interface connector of the protective case.

13. The communication system of claim 10, wherein the connection between the mobile device and radio communication device is a wireless connection.

14. The communication system of claim 10, wherein the antenna is retractable and extendable from the protective case.

15. The communication system of claim 10, wherein the antenna is embedded in the protective case.

16. A communication system comprising:
a first mobile device including a processor and an electronic memory, said processor operable to execute software stored in the electronic memory as a software defined radio application;
a first communication device communicatively connected with the first mobile device, the first communication device external to the first mobile device, the first communication device comprising:
a first radio communication device having a receiver and transmitter for receiving and transmitting radio signals;
wherein the software defined radio application is in communication with the first radio communication device, said software defined radio application operatively controlling the receiver and transmitter of the first communication device;
a second mobile device including a processor and an electronic memory, said processor operable to execute software stored in the electronic memory as a software defined radio application; and
a second communication device communicatively connected with the second mobile device, the second communication device external to the second mobile device, the second communication device comprising:
a second radio communication device having a receiver for receiving signals from the first radio communication device, and transmitter for transmitting radio signals to the first radio communication device.

17. The communication system of claim 16, wherein the first communication device further comprises a controller, the software defined radio application communicates with the controller located, and the controller operatively controls the receiver and transmitter of the first communication device.

18. The communication system of claim 16, wherein the first mobile device and the first radio communication device are communicatively connected by a wired connection.

19. The communication system of claim 16, wherein the first mobile device and the first radio communication device are communicatively connected over a wireless connection.

20. The communication system of claim 16, wherein the first communication device is housed within a protective case.

* * * * *